(12) United States Patent
Heil et al.

(10) Patent No.: US 11,248,907 B2
(45) Date of Patent: Feb. 15, 2022

(54) TEST BLOCK

(71) Applicant: Wipotec GmbH, Kaiserslautern (DE)

(72) Inventors: Ulrich Heil, Glan-Münchweiler (DE); Christian Bur, Saarbrücken (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 16/860,482

(22) Filed: Apr. 28, 2020

(65) Prior Publication Data
US 2020/0408514 A1 Dec. 31, 2020

(30) Foreign Application Priority Data
May 3, 2019 (DE) .................. 102019111560.4

(51) Int. Cl.
*G01B 15/02* (2006.01)
*G01N 23/083* (2018.01)
*G01N 23/04* (2018.01)

(52) U.S. Cl.
CPC ......... *G01B 15/025* (2013.01); *G01N 23/083* (2013.01); *G01N 23/04* (2013.01)

(58) Field of Classification Search
CPC .... G01B 15/025; G01B 21/042; G01B 11/06; G01N 23/083; G01N 23/04
See application file for complete search history.

(56) References Cited

U.S. PATENT DOCUMENTS

| 6,570,955 B1 | 5/2003 | Siffert |
| 2010/0221347 A1* | 9/2010 | Ritman ................... A61P 25/00 424/489 |
| 2011/0206182 A1 | 8/2011 | Perng |
| 2013/0156164 A1* | 6/2013 | Chida ..................... A61B 6/58 378/207 |
| 2014/0037072 A1 | 2/2014 | Han |

FOREIGN PATENT DOCUMENTS

| JP | 2002291729 A | 10/2002 |
| JP | 2012145507 A | 8/2012 |
| JP | 201777271 A | 4/2017 |
| WO | 2017069286 A1 | 4/2017 |

OTHER PUBLICATIONS

A. Brambilla, et al., "Basis material decomposition method for material discrimination with a new spectrometric X-ray imaging detector," Published Aug. 18, 2017, 2017 IOP Publishing Ltd and Sissa Medialab, Journal of Instrumentation, vol. 12, Aug. 2017.
JPO Action dated May 21, 2021, in Japanese patent application No. 2020-079029.

* cited by examiner

*Primary Examiner* — Kiho Kim
(74) *Attorney, Agent, or Firm* — The Culbertson Group, P.C.

(57) ABSTRACT

A test block is formed of at least one profile block and one mating block, wherein the two blocks lying one on top of the other with varying thickness combinations are radiographed together, in order to ascertain, for the pairings of the materials in the respective thickness, in each case a reference value relating to their common radiographic properties.

16 Claims, 6 Drawing Sheets

TEST BLOCK

TECHNICAL FIELD OF THE INVENTION

The present invention relates to test blocks for radiography by means of electromagnetic rays, preferably X-rays. Such a test block is used to determine reference values which describe the radiographic properties of a material and in particular of a pairing of different materials.

BACKGROUND OF THE INVENTION

In the industrial manufacturing of products, in particular foodstuffs, an examination of the products for undesired foreign bodies or contaminants is often required, or the proportion or thickness of a particular material B in a particular position inside, above or underneath the material A of the product is to be ascertained. For example, it is to be established whether, or in what proportion, a piece of meat (as material A) contains bone or fat (as material B) in a particular position. For this purpose, the product can be radiographed by means of X-rays, wherein in principle any other energy form suitable for radiography can also be used, for instance terahertz radiation. The residual intensity of the X-rays emerging from the radiographed product is detected via a detector (line or area sensor) and converted into a so-called "grayscale value" corresponding to the intensity. This is then characteristic of a particular thickness of a material radiographed on its own or of a combination of material A, in a particular thickness, with material B, in a particular thickness (which can also differ from the thickness of material A).

In order to be able to classify the correct thickness of the material or of the materials combined with one another from the grayscale value measured during operation, the associated grayscale value has to be ascertained or simulated beforehand for each possible material thickness or for each pairing of two different materials in different thicknesses in each case and, for the classification, stored in a suitable data processing device, for example in table form (training phase). As classifications are defined here, the term "calibration" can also be used, and the test block could also be called "calibration block". For a grayscale value measured during regular operation, that is, regular production examining products, the thickness of the pure material or of the materials lying one behind the other in the radiation direction can then be ascertained with reference to the table.

For the simulation of the radiographic properties, the two possible materials are, according to current practice, successively placed one on top of the other in different thicknesses and in each case radiographed, in order to be able to ascertain and store the associated grayscale value (here not the materials themselves but instead replacement materials which have the same or similar radiographic properties, are long-lasting and easily processable are preferably used). The creation of a grayscale value table containing all relevant thickness combinations in this way is very time-consuming, and the provision of each replacement material in different thicknesses is also costly.

SUMMARY OF THE INVENTION

An object of the invention is to provide a device and a method in order to be able in each case to acquire a reference value (grayscale value) for a large number of possible combinations of two or also more different materials in each case in a selectable thickness with low time expenditure and design effort.

Various embodiments of the invention combine at least two materials in varying thickness using a special profile block, which is formed of one of the materials. The profile block is formed substantially two-dimensional in a first horizontal longitudinal direction X and a likewise horizontal transverse direction Y at right angles thereto. The third direction Z, perpendicular to the two directions X, Y, is likewise the direction of the thickness. The profile block is made of a first material $M_A$, which has the same, or very similar, radiographic properties as a product material to be examined during production. To this end, the profile block can be formed monolithic. The profile block can be combined with a mating block made of a second material $M_B$, which has the same, or very similar, radiographic properties as the second material to be examined during production. According to one aspect of the invention, the combination is effected by arranging the profile block and the mating block one above or underneath the other in the Z direction or in the radiography direction and radiographing them together. Expediently, the radiographic properties of the material $M_A$ of the profile block with regard to X-rays are different from those of the material $M_B$ of the mating block B.

Profile block and mating block together form a test block according to one aspect of the invention. In some embodiments, the profile block has, in an X-Y matrix, segments $S_{xy}$ with in each case constant thickness $D_{xy}$ in the Z direction. Each segment can be identified by its respective X and Y coordinate (x, y) and can be radiographed in the Z direction in a segment area lying in an X-Y plane. A number of segments n are provided in the X direction and a number of segments k are provided in the Y direction, wherein n and k are in each case greater than one. Each segment extends in the Z direction from a top side $O_{xy}$, which lies at a top side height $HO_{xy}$, to a bottom side $U_{xy}$, which lies at a bottom side height $HU_{xy}$, and thereby forms the thickness $D_{xy}$, that is, the dimension in the Z direction.

The profile block (more precisely: its segment areas provided for the radiography) extend in the Z direction between a base level $H_{min}$, which forms the minimum value for each bottom side height $HU_{xy}$, and a maximum level $H_{max}$, which forms the maximum value for each top side height $HO_{xy}$.

In various embodiments of the invention the profile block is formed with a thickness that increases segment by segment in the longitudinal direction (X direction), wherein the thickness preferably increases in each case by a constant value. In the transverse direction (Y direction) orthogonal to the X direction, the thickness predefined by the respective X coordinate on the other hand remains constant independent of the Y coordinate. However, the elevation of the respective segment changes in dependence on the Y coordinate. The elevation preferably changes, in each case by a constant value, as the Y coordinate increases. This gives the profile block the shape of a staircase on its top side, which ascends in each case as the X and Y directions increase. The bottom side of the profile block in these embodiments by contrast is formed complementary to a staircase, the steps of which have a constant height in the X direction, while the height of the bottom side in the Y direction increases with each step.

The profile block made of the material $M_A$ can thus be combined in the Z direction with a mating block made of the material $M_B$, the top side $O_B$ of which is formed in the shape of a staircase formed complementary to the bottom side of the profile block, for example by laying them one on top of the other, wherein the position of the profile block relative to the mating block (the position to form the test block) is to be referred to as the test arrangement. If the mating block is shaped such that the thickness of each step increases as the Y coordinate increases, in each case a combination of the material $M_A$, in a thickness that increases in the X direction and is constant in the Y direction, with the material $M_B$, in a thickness that is constant in the X direction and increases in the Y direction, results for the individual segments in the X-Y matrix of the profile block with the mating block lying underneath. A large number of combinations of materials of different thickness can thus be produced in a relatively small space without having to change the test arrangement. In the case of a combination of profile block with mating block, the term "segment" comprises the material or the combination of materials which results overall in the position in the Z direction determined by the segment coordinates.

The test arrangement, i.e. the position of the profile block relative to the mating block to form a test block, can be predefined depending on requirements. The two blocks can nestle against each other directly, be positioned spaced apart from each other in the Z direction or be arranged, transverse thereto, offset by one or more segment widths.

Note: the radiographic properties of a material usually change depending on the material thickness. According to the invention, the combination of different material thicknesses serves to combine the thickness-dependent radiographic properties of two materials. Against this background, the combination of different thicknesses or different materials described in this application is to be taken to mean a combination of different radiographic properties (more precisely: absorption properties) of different materials.

In the training phase, the test block formed of the profile block and the mating block can then be moved, for example in the X direction, through an X-ray fan beam extending transversely thereto, wherein the X-rays passing through each segment in the Z direction are detected segment by segment by a detector lying underneath and are evaluated at least with respect to their residual intensity. Unlike in the state of the art, for the superposition of different thicknesses of the first material with different thicknesses of the second material, the materials no longer have to be moved relative to each other in order to detect each desired thickness combination one after the other in time, as all relevant combinations are already ready-formed by the test block being configured as a matrix. The radiography of the individual segments and the acquisition, evaluation and storage of the respective grayscale values in a control or data processing unit can therefore be effected rapidly and in a single position of profile block and mating block relative to each other.

The advantageous difference provided by a test block in accordance with the above aspects of the present invention as compared to the state of the art is clear. To date, individual material pairings (lying one on top of the other in the Z direction) were arranged lying one behind the other in each case in only one direction, for example the longitudinal direction X. In order to form all desired thickness pairings lying one behind the other in this way, a very long and unwieldy test block is required, which therefore cannot be moved through the X-ray fan beam parallel to it (transverse to the conveyor) (or the individual pairings are too short to be able to ascertain a reliable absorption value because of the limited detector width transverse to the conveyor). If the longitudinal direction X of the test block therefore extends in the conveying direction and not transverse thereto during the radiography, the radiography of all individual thickness pairings takes a disproportionately long time. A test block according to the invention by contrast provides a large number of different thickness combinations on a small horizontal surface area two-dimensionally, and, as a result of the compact design, the X or Y axis of the test block can be aligned at right angles or parallel or also at a freely selectable angle to the X-ray fan beam in the training phase, and the rapid detection of all thickness combinations is still easily possible.

Each segment of the profile block has a top side height $HO_{xy}$. The top side height increases in each case segment by segment in the X direction and in the Y direction, with the result that in total the segments form a number ff of different top side heights. A profile block with a 10×10 segment matrix would, for example, form 100 segments with 19 different top side heights. A limitation of the maximum height of the profile block, for example to the level of the top side of the segment with the coordinates x=10, y=1, may, however, be expedient and would result in all segments, the coordinate sum (x+y) of which is greater than 10, having the same top side height $HO_{xy}=H_{max}$ (see FIG. 1). For segments where (x+y)>10, the thickness of the profile block in this case again decreases as the Y coordinate increases and remains constant as the X coordinate increases. The limit can be at any desired level.

According to some embodiments of the invention, the profile block is formed such that for at least four, preferably all, segments, the top side height $HO_{xy}$ increases as the x index (X coordinate) increases and as the y index (Y coordinate) increases up to at most the maximum level ($H_{max}$), while the bottom side height ($HU_{xy}$) remains constant as the x index increases and increases as the y index increases.

Such a profile block made of a first material $M_A$ can be combined with the aid of a suitable mating block made of a second material to form a test block according to one aspect of the invention. Profile block and mating block extend in a longitudinal direction (X), a transverse direction (Y) running at right angles thereto and a vertical direction (Z) running perpendicular to the two directions (X, Y).

The profile block has a number of areas with a different thickness $D_{A1}, D_{A2}, \ldots$ in the Z direction, in the same way as the mating block, which has a number of areas with a different thickness ($D_{B1}, D_{B2}, \ldots$) in the Z direction. Profile block and mating block can be arranged one on top of the other in the Z direction in a predefinable test arrangement, in order to form material pairings that are different from each other and can be radiographed together in the Z direction. According to aspects of the invention, at least two, preferably all, different thicknesses $D_{A1}, D_{A2}, \ldots$ of the profile block are combined in each case with at least two, preferably all, different thicknesses $D_{B1}, D_{B2} \ldots$ in the test arrangement. For each individual thickness present in the profile block there is therefore in each case a combination with each individual thickness formed in the mating block, with the result that material pairings form as follows:

$D_{A1}$-$D_{B1}$; $D_{A1}$-$D_{B2}$; $D_{A1}$-$D_{B3}$ . . . $D_{A2}$-$D_{B1}$; $D_{A2}$-$D_{B2}$; $D_{A2}$-$D_{B3}$ . . . etc.

Some embodiments of the invention provide that the thicknesses of the profile block and the mating block are chosen such that the test block has several segments in which the combination of different individual thicknesses of the profile block with different individual thicknesses of the mating block results in each case in the same overall thickness of the test block. This overall thickness would correspond, for example, to the thickness of a piece of meat to be radiographed (meat: material $M_A$), wherein the piece of meat is to be examined for whether this overall thickness is formed by a piece of bone (bone: material $M_B$), or in what proportion. Despite the same overall thickness, different grayscale values or absorption properties result depending on which material is present in what thickness inside the area of the piece of meat examined. If the overall thickness of the piece of meat is known, the grayscale values learned previously and stored in the table, which were simulated for this overall thickness, can then be selected first of all. The one which most closely corresponds to the measured grayscale value is then to be selected from these grayscale values. The material pairing associated with this simulated grayscale value can then be determined from the stored table.

Two segments with the same overall thickness may be diagonally adjacent to each other in the test block, with the proviso that the sum of their coordinates is constant (x+y=const.). Areas with the same overall thickness then extend in the diagonal direction in the case of a test block with approximately square or rectangular segments (see FIG. 2a for example).

According to some embodiments of the invention, the thickness of the profile block changes by a constant value as the X coordinate. The thickness of the profile block to be radiographed then changes linearly as the X coordinate increases. This is expedient if the radiographic property of the material or the radiation intensity of an X-ray directed through the profile block and then detected by the detector behaves linearly in relation to the thickness. However, a variant in which the change in the thickness in relation to the segment in each case adjacent in the X direction obeys another, nonlinear mathematical condition is also conceivable. Thus, for example, a particular plastic or a metal could absorb X-rays to a disproportionately high or low extent in relation to the thickness radiographed in each case. By adapting the individual thicknesses to this nonlinear relationship of the absorption, it could be ensured that the radiation absorption or the radiation intensity of the detected X-ray then nevertheless decreases or increases incrementally in a linear fashion as the X or Y coordinate increases.

A profile block according to the invention is given its characteristic shape by the specification that the thickness changes segment by segment in the X direction, but remains constant in the Y direction (disregarding limitations which are predefined by a maximum overall height). Through this specification, the profile block can be arranged with a staircase-shaped mating block one on top of the other in the Z direction such that, in an X-Y matrix, the different thicknesses of the profile block are in each case combined with the different thicknesses of the mating block. In a comparatively tight space, a large number of different thickness combinations can thus be achieved without the profile block and mating block having to be moved relative to each other in the process. A test block in accordance with the invention can in each case vary and combine the parameters thickness of the profile block
thickness of the mating block, and
overall thickness of the test block segment by segment in a tight space. Specific linear or nonlinear absorption properties can also be taken into consideration by adapting the respective thicknesses.

Most preferably, the thickness of a segment adjacent to a starting segment in the ascending X direction is chosen such that the top side height of this adjacent segment corresponds to that top side height of the segment which is adjacent to the starting segment in the ascending Y direction. Starting from a starting segment, the step height to the next higher segment in the X direction is then equal to that to the next higher segment in the Y direction.

The profile block according to the invention comprises a number, denoted by "ff", of different top side heights above the base level. The top side of each segment in each case forms a top side height, wherein several segments can have the same top side height. As FIG. 1 discloses among other things, this is because the top side height of a segment is determined on the one hand by the thickness of the profile block at this segment and on the other hand by the bottom side height, thus the height level, from which the respective segment extends upwards in the Z direction. As both vary according to the invention, several segments with the same top side height result when the bottom side height increases in the Y direction to the same extent as the thickness does in the X direction.

The top side of the profile block according to the invention is characterized in that—starting from a starting segment—the top side height of both the neighboring segment with the next higher X index and the one with the next higher Y index increases, as long as a predefined maximum height $H_{max}$ does not limit this increase. The height difference in the Z direction between a starting segment and an adjacent, higher neighboring segment in the X direction or in the Y direction can also be referred to as the profile block step. In the case of a profile block with n adjacent segments in the X direction and k adjacent segments in the Y direction, the total number f of different top side heights or profile block steps is obtained according to the formula $$f\!f=(n+k-1)$$

The profile block shown in FIG. 1, where n=10 and k=10, would have 100 segments with f=19 different top side heights in the case of a design with unlimited height. For structural reasons, the profile block can, however, also be limited to a height or a number of profile block steps, above which no more additional top side heights are formed in the matrix. The profile block according to FIG. 1, for example, is limited to a maximum height $H_{max}$, which is determined by the top side heights of those segments for the coordinates of which (x+y)=11.

The thickness ($D_{xy}$) of a segment in the profile block (A) preferably follows from the condition $D_{xy}=HO_{xy}-HU_{xy}$, wherein the following applies to a group of at least four segments:

$$HO_{xy}=H_{min}+(H_{max}-H_{min})\cdot(x+y-1)/f\!f$$

and $$HU_{xy}=H_{min}+(H_{max}-H_{min})\cdot(y-1)/f\!f$$

The above-named relationship preferably applies at least to all segments with the coordinate x=1 or y=1. A maximum height $H_{max}$ is not achieved until the profile block has formed n or k different top side heights for y=1 in the X direction and for x=1 in the Y direction, respectively.

Thus, for the profile block shown in FIG. 1 with a limited number of profile block steps (ff=10), the top side height $HO_{2,7}$ follows for the segment $S_{2,7}$, assuming by way of example $H_{max}=10$, $H_{min}=0$:

$$HO_{2,7}=0+(10-0)\cdot(2+7-1)/10=8$$

The completely formed profile block (according to the model of FIG. 1, but with a full number of profile block steps ff=19) would correspondingly have the maximum height $H_{max}=19$, such that, for the segment $S_{2,7}$, the top side height would again result as follows:

$$HO_{2,7}=0+(19-0)\cdot(2+7-1)/19=8$$

and the top side height of the segment $S_{7,8}$, chosen by way of example, would result as follows:

$$HO_{7,8}=0+(19-0)\cdot(7+8-1)/19=14$$

According to an advantageous embodiment, each segment has an area with a certain minimum extent in the X and Y directions, in order to be able to form a representative average value for the intensities, detected by the detector, of the X-rays directed through this segment. The horizontal dimensions of each segment or at least of the area in the segment provided for the radiography are preferably between 40 mm×40 mm, most preferably 20 mm×20 mm, still more preferably greater than 5 mm×5 mm.

The embodiments of the profile block shown in the figure examples show segments which have a substantially square shape in the horizontal direction. However, any desired embodiment in which the segments are formed round or rectangular for example, thus have a larger extent in one of the two horizontal directions than in the respectively other horizontal direction, is conceivable. This may be expedient in order to be able to generate a better average value on the basis of the longer of the two dimensions. Some or all segments ($S_{xy}$) preferably have a substantially flat bottom side ($U_{xy}$) and/or top side $O_{xy}$ perpendicular to the Z direction.

The mating block, which is combined with the profile block to form the test block, is made of a material $M_B$ which differs in at least one property from the material $M_A$ of the profile block. The property difference should expediently be detectable by X-rays. The difference can in general relate to the X-ray absorption properties of the material. However, a difference in the wavelength spectrum of an X-ray directed through the material is also conceivable. Any other material property, which is detectable by examination of an electromagnetic ray directed through the material (X-ray, terahertz radiation, etc.), can also be used as a criterion for distinguishing between material $M_A$ and $M_B$.

The mating block is preferably monolithic, thus is produced from a continuous body. Joints that are difficult to examine and additional assembly effort are thereby avoided.

The mating block is expediently formed with a staircase-shaped top side and comprises a number m of steps $T_y$ of different material thickness lying one behind the other in the Y direction. The steps can be radiographed in the Z direction and their thickness $DT_y$, in each case dependent on the Y position, is preferably constant in the X direction.

The top side of the mating block is preferably formed complementary to the bottom side of the profile block. Because the bottom side height of the segments of the profile block is constant in the X direction for each of the steps of the mating block, the profile block can preferably be fitted onto the mating block from above, with the result that the top side of the mating block or of its individual steps $T_y$ can rest against the bottom side of the profile block running at a constant height in the X direction. This results in the combination of two different materials in the Z direction in a compact design in an X-Y matrix in the area of each segment $S_{xy}$, in order to radiograph them together.

Alternatively, the mating block can also be arranged spaced apart from and/or above the profile block in the Z direction. The arrangement with the smallest possible gap between profile block and mating block is to be preferred however, as the angular segment of an X-ray fan beam, which can be directed through both blocks within the segment, decreases in size as the gap between profile block and mating block increases and makes the generation of a reliable average value more difficult. Of course, the arrangement of profile block on top with mating block lying underneath can, as a whole, also be inverted (turned upside down). Taking into consideration the X and Y directions or coordinates then to be corrected, identical radiographic conditions in the Z direction result for the individual segments.

In order that the profile block and mating block are formed as far as possible complementary to each other, it is preferably provided that the dimension in the Y direction of a step $T_y$ corresponds to that Y dimension of a segment $S_{xy}$ of the profile block.

The different thicknesses of the mating block, which are to be combined with the different thicknesses of the profile block, result from the different step heights. Preferably, the mating block therefore extends from a bottom side which is common to all steps to a Z height which is different for each step. The height difference between two steps adjacent in the Y direction preferably corresponds to the difference in thickness between two segments of the profile block adjacent in the X direction. The different segments already described previously can thereby be formed with the same overall thickness. Alternatively, however, it is conceivable to choose the thicknesses or change in thickness of the individual steps lying one behind the other in the Y direction independently of the thickness of the segments of the profile block. In particular, taking the absorption properties of the mating block material into consideration it may be expedient to choose the thicknesses or the difference therein between two adjacent steps according to a linear or nonlinear relationship between material thickness and absorption properties. Similarly to the profile block, nonlinear relationships between material thickness and absorption properties can in particular thus be transformed into a linear relationship between the respective Y position of the step and its radiation absorption.

Although the material pairing of the profile block with the mating block is of particular interest according to the invention, the test block is also to offer the possibility of radiographing only one of the two blocks in the Z direction at different thickness positions. Thus the absorption properties of the pure profile block material and/or of the pure mating block material can additionally be detected in the test arrangement; in this case, the other material in each case would be air.

In an some embodiments it is therefore provided that a section $A_0$ of the profile block projects laterally in the X direction or in the Y direction beyond the mating block B in the form of a projection, with the result that no section of the mating block B, but instead preferably the material "air", is arranged above or underneath the profile block A there. Equally, it can alternatively or additionally be provided that a section $B_0$ of the mating block B projects laterally in the X direction or in the Y direction beyond the profile block A in the form of a projection, with the result that no section of the profile block A, but instead preferably air, is arranged above or underneath the mating block B there. Correspondingly, FIG. 2 shows that the profile block A projects above the mating block B in the Y direction with the section $A_0$, while at the same time the mating block B projects underneath the profile block A in the X direction with the section $B_0$. The segments forming the projection are preferably approximately twice as wide as the segments adjacent to the projection (thus the segments $S_{x,1}$ also forming the projection of the profile block in FIG. 2 are in each case approximately twice as wide as the segments $S_{x,2}$ adjacent in the Y direction). As a result, these segments provide an area with material of the other block above or underneath it as well as a further area which is formed exclusively by the respective block.

According to additional embodiments, it is furthermore provided that at least one, preferably monolithic, supplementary block C, D, . . . formed of a third material $M_c$ is arranged above, underneath or between the profile block A and the mating block B, in order to produce several different material pairings to be radiographed in the Z direction. The supplementary block can have a thickness that is constant for each segment or thicknesses that increase step by step, in order to correspondingly affect the radiation absorption of the respective segments. However, it is also conceivable additionally to alter the radiographic properties of only a selection of the segments, formed by the profile block and by the mating block, in a targeted manner through the material $M_c$, and to have no effect on other segments. For example, from a particular thickness of the mating block B (which could for example represent bone with the material $M_B$) an additional material layer C could be arranged above, underneath or between the blocks A and B in a constant or variable thickness in the Z direction, (which could for example represent a fat layer always occurring from a particular bone thickness). In principle, any number of different materials can be arranged one on top of the other in the Z direction. However, it is to be borne in mind that the combination "any thickness of the profile block with any thickness of the mating block" that is possible for only two materials according to the invention is no longer readily possible in the three-dimensional space when a further "dimension" is added by the additional material C.

In the field of food processing, it can preferably be provided that the radiographic properties of the material of the profile block or of the mating block or of the supplementary block with regard to X-rays substantially correspond to those of optionally animal fat, water, meat, bone, glass, metal or plastic. Depending on the application case, other material can also be used which corresponds to the radiographic properties of a material to be examined, within predefinable tolerances, or is identical to this material.

According to further embodiments of the invention, it is furthermore provided that one or more of the blocks A, B, C . . . have an identification device which are preferably detectable by means of X-rays and/or contain information or make at least one of the blocks classifiable. This can involve a clear identification of at least one of the blocks. For instance the arrangement of suitable metallic elements or codes on the or in the respective block would be conceivable, in order to be able to draw conclusions about the nature of the block from the X-ray image forming when it is X-rayed. The spatial alignment and/or the position of a block can also be determined in this way. For this purpose, the block could have spatially arranged identification elements (in the simplest case, these are small metallic elements such as, for example, balls). The evaluation of the X-ray image with the aid of trigonometric principles then makes it possible (for instance immediately before the training phase) to check whether the blocks are correctly positioned relative to each other and/or relative to the X-ray source. Measuring errors can thus be avoided. Finally, the identification device can also be used to ascertain characteristic values or correction values which relate, for example, to the radiographic properties of a particular block or of individual segments of the block or of the entire test block. The evaluation of the X-ray image for ascertaining the location, the position or the characteristic values or correction values or the storage of the characteristic values identifying the individual blocks and materials can be effected with the aid of a computer, and control signals that are dependent thereon for controlling the training phase (termination, realignment, conveying speed etc.) can be automatically generated.

A test block according to the invention can be a component of an X-ray inspection device. The X-ray inspection device can of course also contain several different test blocks, profile blocks and/or mating blocks. A range of profile blocks and mating blocks is also conceivable in which one profile block can be combined with different mating blocks or different profile blocks can be combined with one mating block. Thus, for example, a profile block representing the material meat could be combined in one case with a mating block which has the radiographic behavior of bone, while a combination of the profile block with another mating block would simulate the pairing meat-fat.

The matrix size of a profile block, mating block, supplementary block or test block according to the invention is theoretically unlimited. It increases with the number of desired thickness combinations. Even a 2×2 segment matrix stretching in the X and Y directions provides the advantage according to the invention of being able to combine different material thicknesses with one another while saving space. A larger matrix allows correspondingly more combinations, wherein the number n of segments in the X direction can be different from the number k of segments in the Y direction, depending on the application case. A completely formed 12×12 test block provides 144 combinations, for example, wherein a lateral projection in each case additionally formed by the profile block and the mating block adds another 24 combinations of the blocks with the material "air".

When a test block according to the invention is radiographed, it can be expedient to use only those rays which are at a particular distance from the edge of the segment for the evaluation of the radiographic properties of each segment. The disruptive effect of jumps in thickness to adjacent segments is thus safely ruled out during the evaluation or average value generation.

The components of the test block according to the invention (profile block, mating block, supplementary block) can be produced in different ways. Coming into consideration, among others, is production by 3D printing, sintering, milling, compression molding, bonding, casting, lasering, electrical discharge machining, etching or combinations thereof. The components can if necessary be connected to one another—even permanently—by mechanisms known to a person skilled in the art, for instance by bonding, screwing together, locking together, welding or combinations thereof.

The present invention has been described with reference to spatial axes with associated coordinates x, y, z and indices for the individual segments. The naming or also the alignment of the spatial axes relative to each other is, however, not essential to the invention, but rather the principle of forming a profile block which in each case forms segments with a different thickness and a different height dimension in the Z direction in two spatial directions X and Y that are different from each other is. For structural reasons, it is suitable to allow the thickness to increase in steps and in each case by a constant value, for example in the X direction as the X index increases, while the top side height increases in steps in the same way in the Y direction. If it is structurally possible, the profile block according to the invention is, however, not limited to such an embodiment strictly increasing in steps. An embodiment of the invention is also realized when, in any desired X-Y position of a two-dimensional matrix, the profile block has at least four segments with thicknesses that are in each case different and top side heights that are in each case different in a third dimension, in order to combine each segment in the Z direction with a section of the mating block of particular thickness and thus, as far as possible, to make all thickness combinations of the profile block with the mating block possible.

These and other advantages and features of the invention will be apparent from the following description of representative embodiments, considered along with the accompanying drawings.

DESCRIPTION OF REPRESENTATIVE EMBODIMENTS

Figure 1:
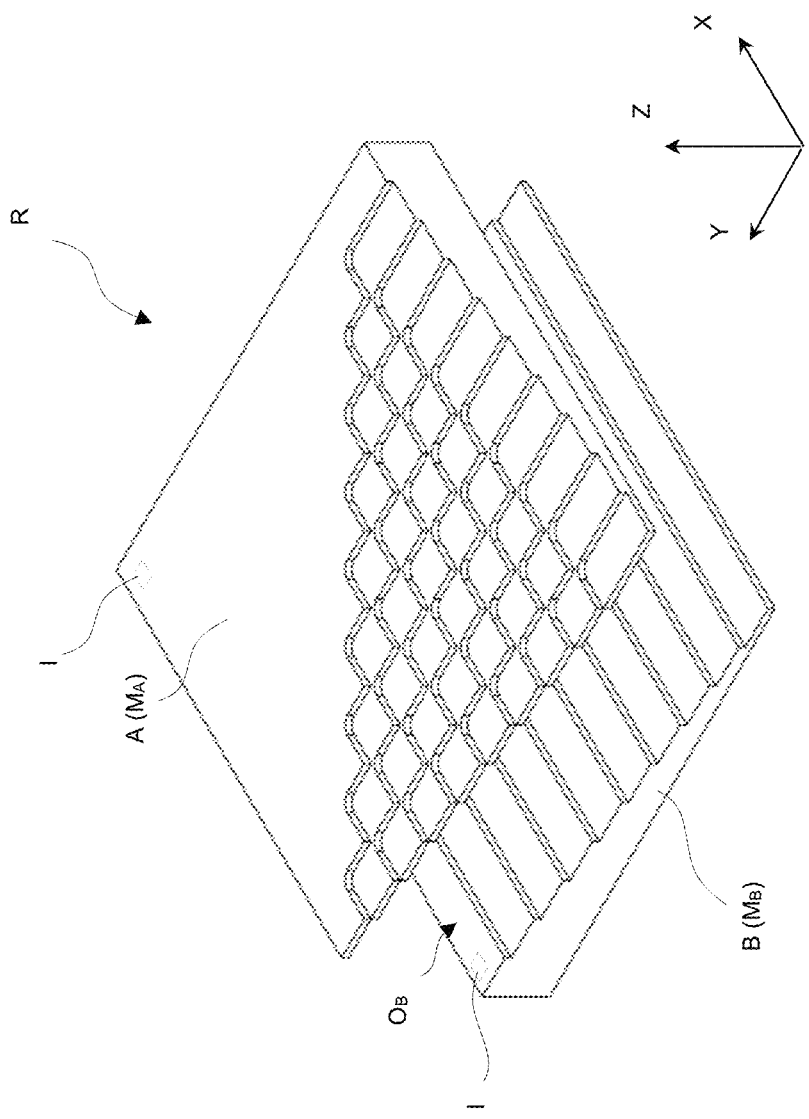
FIG. 1 is perspective view of a profile block above a mating block.

FIG. 1 shows a simplified perspective representation of a test block R according to the invention. The test block R comprises a profile block A, which is formed of a first material $M_A$ and extends in a longitudinal direction X, a transverse direction Y and a vertical direction Z. A staircase-shaped mating block B made of a second material $M_B$ is arranged underneath the profile block A in the Z direction. Wide areas of the profile block A lie above the mating block B in the Z direction. An X-ray directed from above through the profile block A in the Z direction therefore penetrates first the profile block A and thereafter also the mating block B lying underneath.

Figure 2:
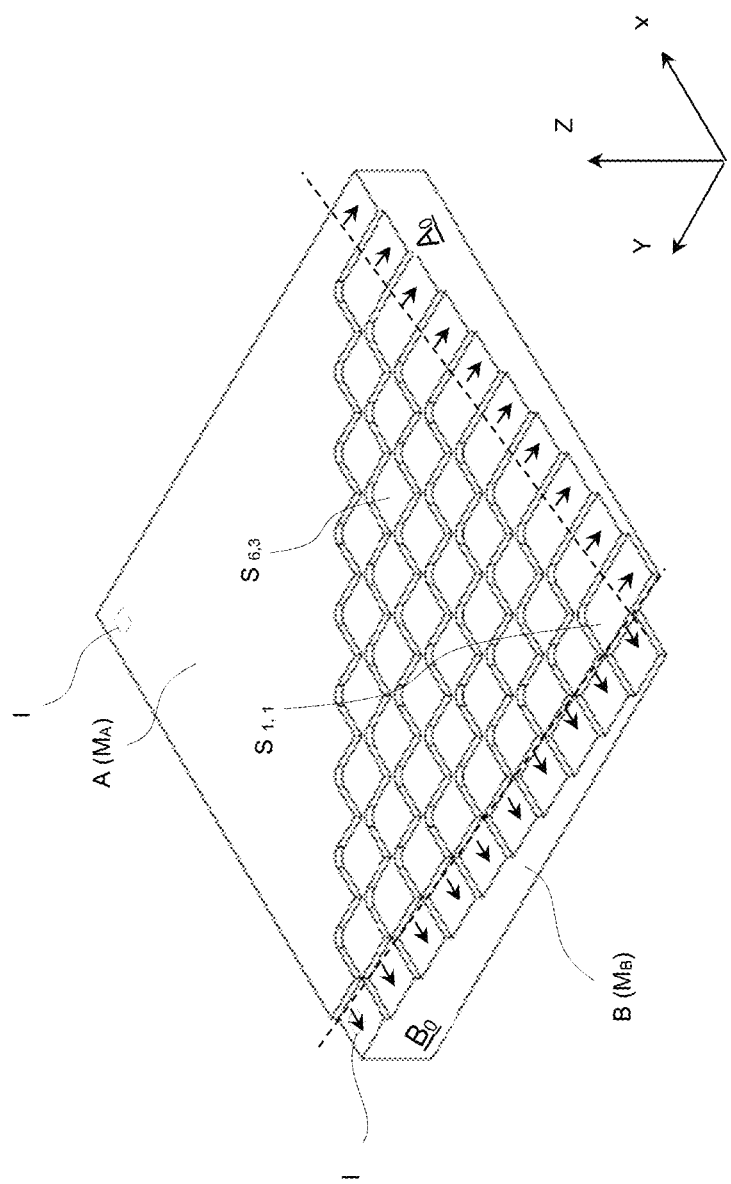
FIG. 2 is a perspective view with the blocks shown in FIG. 1 lying directly one on top of the other.

FIG. 2 shows, in a perspective arrangement, the combination of the profile block A with the mating block B already known from FIG. 1, wherein here the profile block lies directly on top of the mating block with virtually no gap in between.

Figure 3:
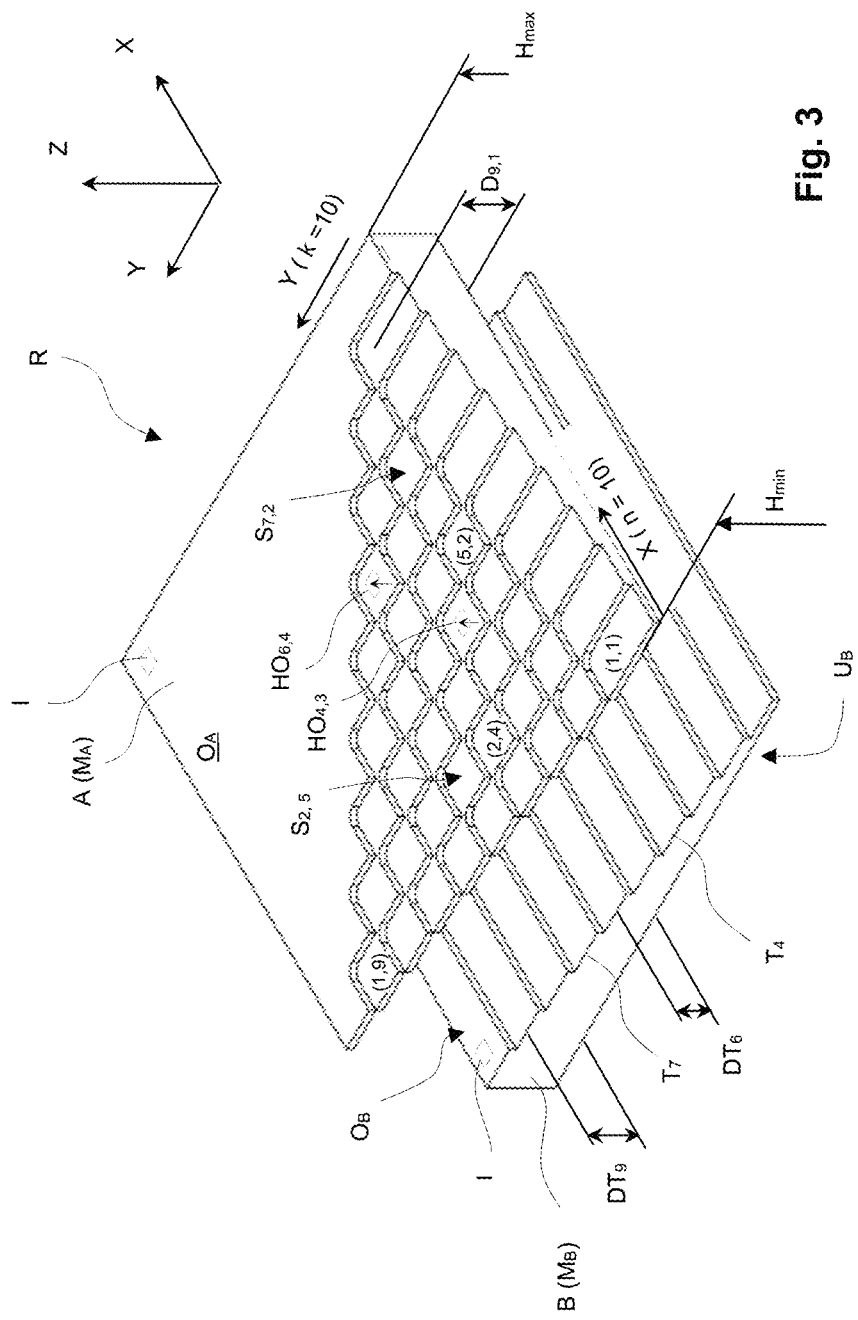
FIG. 3 is a view similar to FIG. 1 but showing further details.

FIG. 3 shows the matrix system, according to which a test block according to the invention is constructed. The profile block A extends in the X direction along a number n of segments $S_{xy}$, wherein n=10 in this embodiment. In the Y direction, the profile block A is divided into a number k of segments, wherein k=10 is chosen in this embodiment. Each segment $S_{xy}$ is denoted by its X and Y coordinates x, y. Thus, for instance, the segment with the coordinates x=1 and y=1, which would then be denoted "$S_{1,1}$", lies in the frontmost lowest section of the profile block A in FIG. 1. For further segments the coordinates are entered by way of example (namely (1,9), (2,4), (5,2), and (1,1)), and the segments $S_{7,2}$ and $S_{2,5}$ are indicated for illustration.

Figure 4:
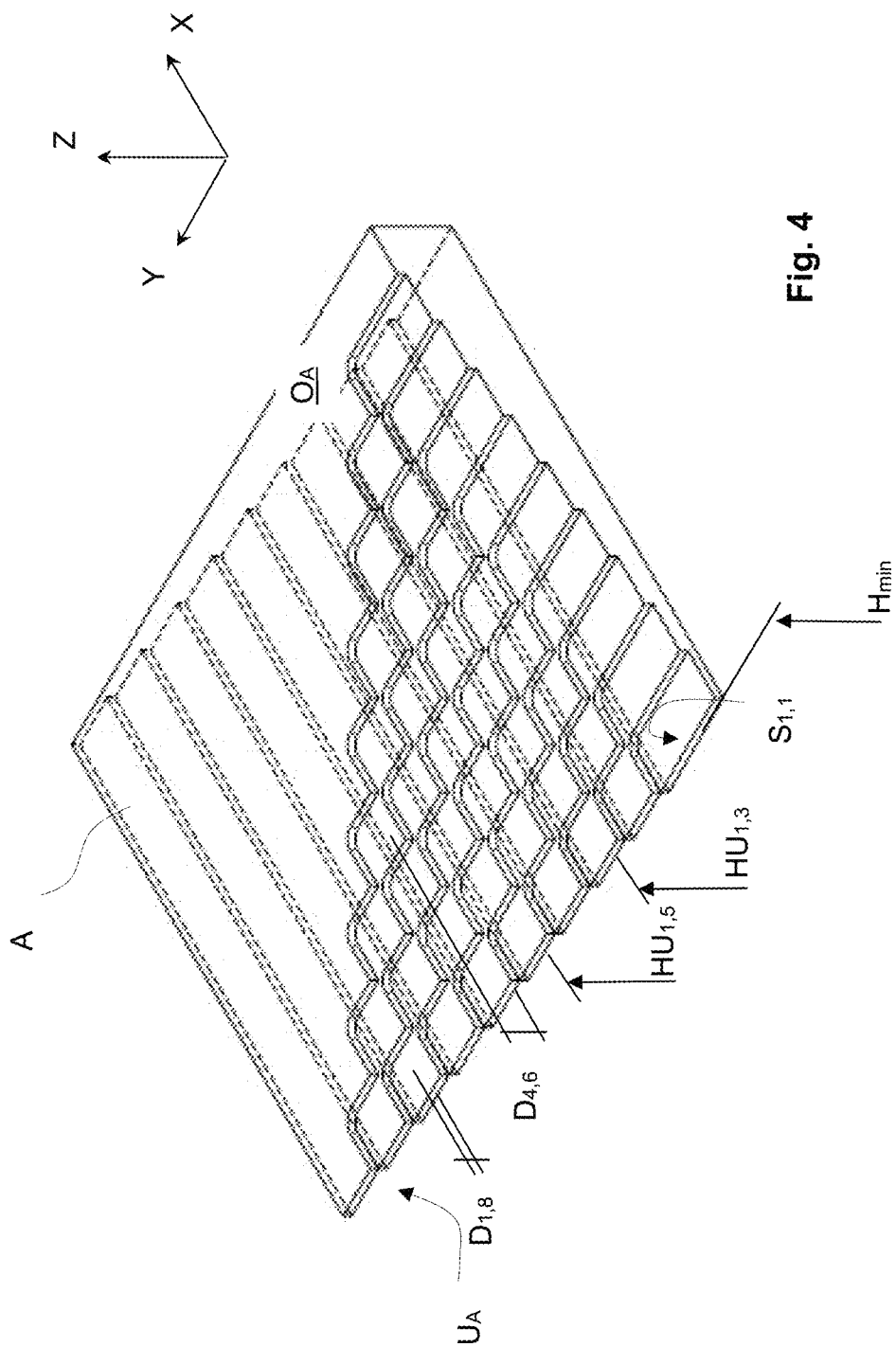
FIG. 4 is a perspective view of a profile block placed atop a mating block and showing upper surfaces of the mating block with hidden lines.

Referring to both FIGS. 3 and 4, the profile block A extends from a top side $O_A$ to a bottom side $U_A$. The bottom side $U_A$ is limited at the bottom by a minimum level $H_{min}$, while the top side lies at a maximum level $H_{max}$.

As perhaps best shown in the view of FIG. 3, each segment of the profile block A extends from a segment-related bottom side height $HU_{xy}$ to a segment-related top side height $HO_{xy}$ ($HO_{4,3}$ and $HO_{6,4}$ being called out as examples) and in between forms the thickness $D_{xy}$ of the segment in each case (with $D_{9,1}$ being shown for example). As can be seen in particular along the coordinate y=1, the thickness of the profile block A in each case increases as the X coordinate increases and reaches the maximum height $H_{max}$ of the profile block in the segment $S_{10,1}$. In the Y direction, the respective thickness of the profile block A does not change, as long as the maximum height $H_{max}$ of the profile block A is not reached. In the area below the maximum height, the thickness therefore only depends on the X position. In the Y direction, on the other hand, the top side height $HO_{xy}$ increases as the Y coordinate increases, while the bottom side height $HU_{xy}$ also increases in each case by the same amount, and the thickness $D_{xy}$ therefore remains constant within the same Y coordinate. The bottom side height $HU_{xy}$ does not change as the X coordinate increases. The surface $O_A$ thereby forms in the manner of a two-dimensionally ascending staircase, while the bottom side $U_A$ has a simple staircase shape.

The mating block B arranged underneath the profile block A in FIG. 3 likewise extends in the X and Y directions and is formed as a staircase with individual steps $T_y$. These extend in the Z direction from a common bottom side $U_B$ to a step height, which is different for each Y coordinate, with an individual step thickness $DT_y$. Step thicknesses $DT_9$ and $DT_6$ and steps $T_7$ and $T_4$ are labeled by way of example in FIG. 3. The width of a step in the Y direction corresponds in each case to the width of the segments of the profile block A here. Due to this shaping of the bottom side $U_A$ of the profile block and of the top side $O_B$ of the mating block, the respective surfaces of the two blocks can nestle against each other largely with no gap in between if they are laid one on top of the other (FIG. 2).

In this arrangement (shown in FIG. 2), the profile block A projects laterally in the Y direction beyond the mating block B with a projection $A_0$. In this area, an X-ray directed along the Z direction through the test block detects only the material of the profile block A, while the area underneath the projection is considered to be the material "air". In the same way, the mating block projects laterally in the X direction under the profile block A with a projection $B_0$, with the result that here again the material "air" would be X-rayed instead of the profile block material.

The arrangement of the profile block and the mating block shown among other things in FIG. 2, which is also referred to as the test arrangement, according to the invention forms the combination of different material thicknesses of the two blocks in an X-Y matrix in a compact design. If the test block is transported, for example in the X direction, through an X-ray fan beam which penetrates the test block parallel to the Y direction for example, all relevant thickness combinations can be radiographed and the in each case common radiographic properties can be individually detected for each segment by a detector (line or area sensor), not shown in more detail, and processed, stored or transmitted via a suitable data processing device in a short time and without having to change the arrangement of profile block and mating block relative to each other.

FIGS. 1-3 show that in an embodiment in accordance with the present invention, both the profile block A and mating block B may include a respective identification device I. Such an identification device I is preferably detectable by means of X-rays and/or contains information or otherwise makes the respective block classifiable. For example, a respective identification device I may comprise an arrangement of suitable metallic elements or codes from which information about the nature of the respective block may be ascertained from the X-ray image of the block, typically by reference to stored information regarding the block. The identification devices I or elements making up such devices may also be used to detect the spatial alignment and/or position of the block or position of the given block relative to another block.

Figure 5:
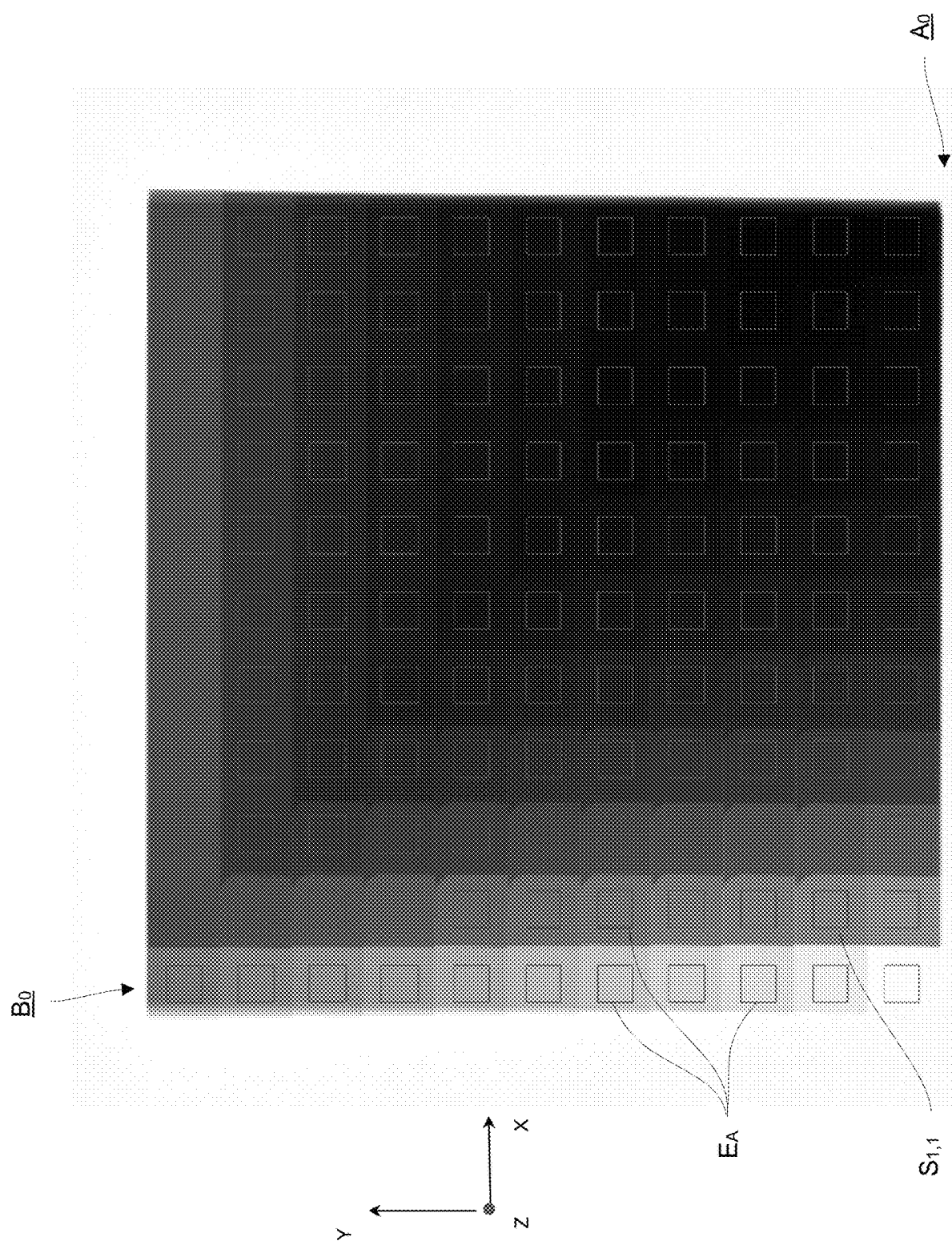
FIG. 5 is an image of the radiographic result of a test block according to the invention.

FIG. 5 shows the radiographic result of a test block according to the invention with a projection of both the profile block and the mating block. The segment $S_{1,1}$ is labeled for orientation. It can be seen that the intensity of the X-ray reaching the detector decreases as the X and Y coordinates increase, because the overall thickness of the test block increases in this direction, as long as the maximum height is not yet reached. As the test block is limited in this embodiment to the maximum height of the segment $S_{10,1}$ ($H_{max}=HO_{10,1}$), the thickness of the profile block A no longer increases for segments, the coordinate sum (x+y) of which is greater than 11. As the step thickness $DT_y$ of the mating block B is also constant in the X direction, the grayscale values for all segments where (x+y)>11 are constant as the X coordinate increases. The outlined areas $E_A$ indicated in the individual segments of FIG. 5 represent those areas which are used for the evaluation of the radiography, where appropriate with the generation of average values, in order to be able to safely rule out possible effects of adjacent segments with a deviating thickness.

Figure 6:
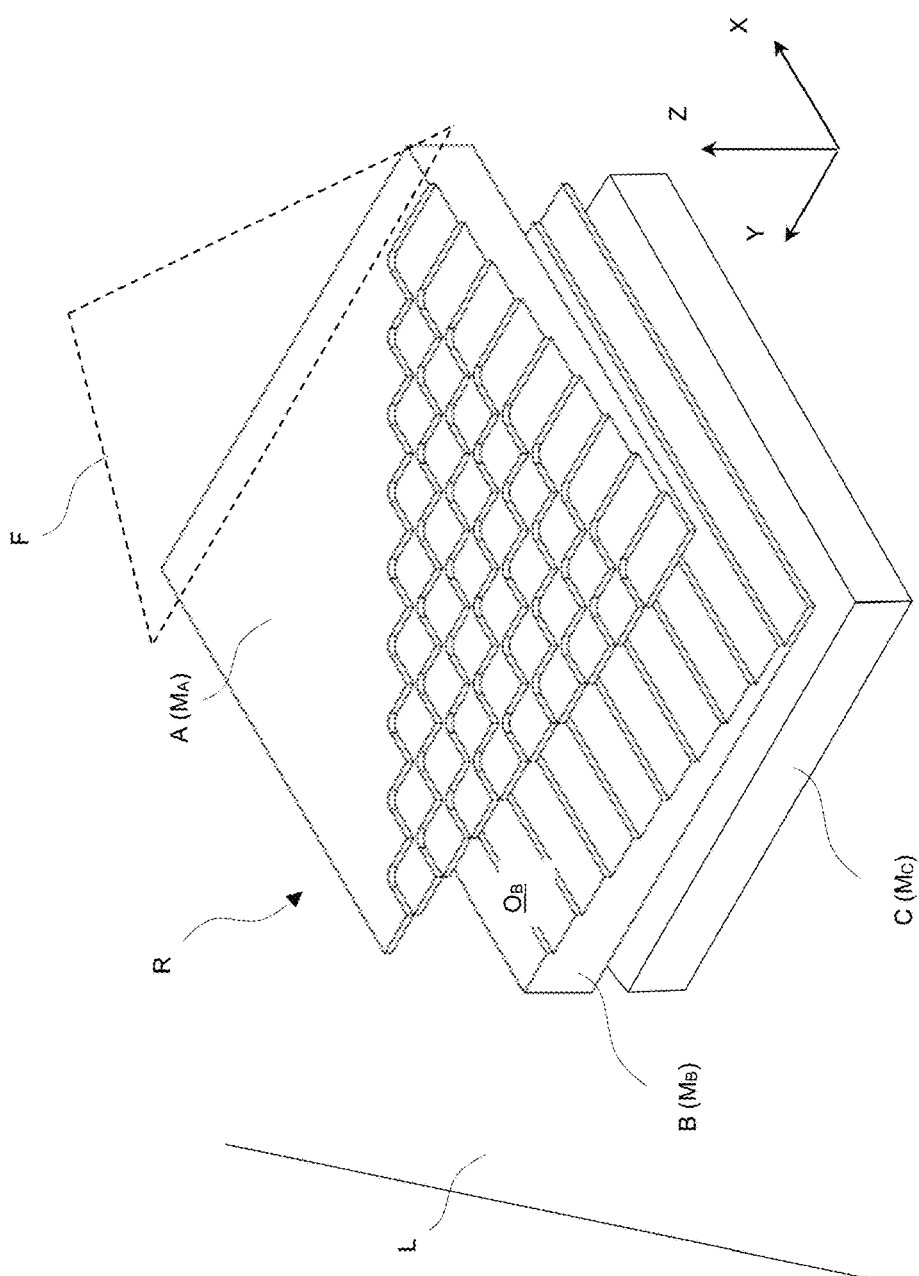
FIG. 6 is a perspective view of the profile block and mating block of FIG. 1 together with an additional material block C all within an inspection device.

FIG. 6 shows the profile block A and mating block B as in FIGS. 1-3. However, the test block R in the case of FIG. 6 further includes and additional block C of an additional material $M_C$. These three blocks A, B, and C are shown separated in FIG. 6 for clarity, but are shown in an order vertically in which they may reside supported on a surface L of an inspection device. This surface L of the inspection device may be the surface of a suitable conveyor which conveys the test block R through the inspection device such as in the X direction relative to an X-ray beam F projected in a Y-Z plane from a suitable X-ray source (not shown). The bottom line of beam F is shown at the level at which it intersects the upper surface of profile block A, however, it will be appreciated that the beam continues on downwardly in the orientation of the figure to pass through all of the blocks A, B, and C of test block R.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE CHARACTERS

A profile block
$A_0$ section, projection of the profile block
B mating block
$B_0$ section, projection of the mating block
C, D supplementary block
$D_A$ a thickness of the profile block A
$D_B$ a thickness of the mating block B
$D_{xy}$ thickness of the segment $S_{xy}$
$E_A$ Evaluation areas
F X-ray fan beam in inspection device
ff number of different top side heights
$H_{max}$ maximum level
$H_{min}$ base level
$HO_{xy}$ top side height of the segment $S_{xy}$
$HU_{xy}$ bottom side height of the segment $S_{xy}$
I Identification device
k number of segments in the Y direction
L surface of inspection device conveyor
m number of steps T
$M_A$ material of the profile block A
$M_B$ material of the mating block B
$M_C$ material of additional block C
n number of segments in the X direction
$O_A$ top side of the profile block A
$O_B$ top side of the mating block B
R test block
$S_{xy}$ segment in the position x, y
$T_y$ step of the mating block B in the position y
$U_A$ bottom side of the profile block A
$U_B$ bottom side of the mating block B
x index, X coordinate
X longitudinal direction
y index, Y coordinate
Y transverse direction
Z vertical direction

The invention claimed is:

1. A test block for X-ray inspection systems, the test block including:
   (a) a profile block formed of a first material and extending in an X direction, a Y direction, and a Z direction, the Y direction running at right angles to the X direction to define an X-Y plane, and the Z direction running perpendicular to both the X direction and Y direction, the profile block having, in a profile block X-Y matrix extending in the X direction and Y direction, profile block segments each having a constant dimension in the Z direction, each profile block segment being identifiable by its respective coordinates in the X direction and Y direction with a number (n) of profile block segments provided in the X direction and a number (k) of profile block segments provided in the Y direction;
   (b) a mating block formed from a second material which differs in at least one radiographic property from the first material, the mating block extending in the X, Y, and Z directions and including a number (m) of steps in the Y direction, each respective step having a constant Z dimension along the X direction;
   (c) the profile block having a number of profile block thickness areas, each of the number of profile block thickness areas having a different respective dimension in the Z direction;
   (d) the mating block having a number of mating block thickness areas, each of the number of mating block thickness areas having a different respective dimension in the Z direction;
   (e) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction; and
   (f) when placed in the test arrangement, (i) a projection section of the profile block extends in the X direction or in the Y direction beyond the mating block so that no section of the mating block aligns in the Z direction with the projection section of the profile block and (ii) a projection section of the mating block extends in the X direction or in the Y direction beyond the profile block so that no section of the profile block aligns in the Z direction with the projection section of the mating block, wherein the dimension by which the projection section of the profile block extends beyond the mating block and the dimension by which the projection section of the mating block extends beyond the profile block each corresponds to the dimension, in the same direction, of a respective profile block segment adjacent to the respective projection section.

2. The test block of claim 1 wherein the number of material pairings include a number of first material pairings of a first overall dimension in the Z direction with each respective one of the first material pairings having a different combination of profile block dimension in the Z direction and mating block dimension in the Z direction.

3. The test block of claim 1 wherein:
   (a) each profile block segment extends in the Z direction from a respective top side with an associated top side height ($HO_{xy}$) to a respective bottom side with an associated bottom side height ($HU_{xy}$) and thereby forms the dimension of that segment in the Z direction;
   (b) all of the profile block segments extend in the Z direction between a base level ($H_{min}$) which forms a minimum value for each bottom side height ($HU_{xy}$), and a maximum level ($H_{max}$) which forms a maximum value for each top side height ($HO_{xy}$);
   (c) a number (ff) of the profile block segments include a different respective top side height ($HO_{xy}$) above the base level ($H_{min}$); and
   (d) for at least four profile block segments the respective top side height ($HO_{xy}$) increases as the coordinate in the X direction increases and as the coordinate in the Y direction increases up to at most the maximum level ($H_{max}$), and the bottom side height ($HU_{xy}$) remains constant as the coordinate in the X direction increases and increases as the coordinate in the Y direction increases.

4. The test block of claim 3 wherein each change in dimension in the Z direction from one respective profile block segment to a next profile block segment as the coordinate in the X direction increases has a constant value.

5. The test block of claim 3 wherein the dimension of each profile block segment in the Z direction increases as the coordinate in the X direction increases and remains constant as the coordinate in the Y direction increases.

6. The test block of claim 3 wherein for each profile block segment the dimension in the Z direction (Dxy) is given by Dxy=HOxy−HUxy, wherein the following relationships apply to a group of at least four profile block segments:

$$HOxy = H\min + (H\max - H\min) \cdot (x+y-1)/ff$$

and $$HUxy = H\min + (H\max - H\min) \cdot (y-1)/ff.$$

7. The test block of claim 1 wherein the dimension in the Y direction of each respective step corresponds to the dimension in the Y direction of each of the profile block segments.

8. The test block of claim 1 wherein each step extends from a substantially planar bottom side of the mating block, which is common to all of the steps, to a height which is different for each step above the bottom side.

9. A test block for X-ray inspection systems, the test block including:
   (a) a profile block formed of a first material and extending in an X direction, a Y direction, and a Z direction, the Y direction running at right angles to the X direction to define an X-Y plane, and the Z direction running perpendicular to both the X direction and Y direction;
   (b) a mating block formed from a second material which differs in at least one radiographic property from the first material, the mating block extending in the X, Y, and Z directions;
   (c) the profile block having a number of profile block thickness areas, each of the number of profile block thickness areas having a different respective dimension in the Z direction;

(d) the mating block having a number of mating block thickness areas, each of the number of mating block thickness areas having a different respective dimension in the Z direction;

(e) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction; and (f) wherein the profile block includes a profile block identification device which identifies the profile block, or the mating block includes a mating block identification device which identifies the mating block, or both the profile block includes the profile block identification device and the mating block includes the mating block identification device.

10. The test block of claim 9 wherein the profile block identification device if included indicates a spatial orientation or position of the profile block and the mating block identification device if included indicates a spatial orientation or position of the mating block.

11. The test block of claim 9 wherein the profile block identification device if included indicates characteristic values or correction values for individual areas of the profile block and the mating block identification device if included indicates characteristic values or correction values for individual areas of the mating block.

12. The test block of claim 9 wherein the profile block identification device if included indicates radiographic properties of the profile block and the mating block identification device if included indicates radiographic properties of the mating block.

13. A test block for X-ray inspection systems, the test block including:

(a) a profile block formed of a first material and extending in an X direction, a Y direction, and a Z direction, the Y direction running at right angles to the X direction to define an X-Y plane, and the Z direction running perpendicular to both the X direction and Y direction;

(b) a mating block formed from a second material which differs in at least one radiographic property from the first material, the mating block extending in the X, Y, and Z directions;

(c) the profile block having a number of profile block thickness areas, each of the number of profile block thickness areas having a different respective dimension in the Z direction;

(d) the mating block having a number of mating block thickness areas, each of the number of mating block thickness areas having a different respective dimension in the Z direction;

(e) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction; and (f) an additional block formed from a third material different from the first material and second material, the additional block, when placed in an operating position relative to the profile block and mating block in the test arrangement, residing in alignment in the Z direction with at least a portion of the profile block and with at least a portion of mating block.

14. A method of using a test block for detecting the radiographic properties of a combination of a first material and a second material where the test block includes, (i) a profile block formed of a first material and extending in an X direction, a Y direction, and a Z direction, the Y direction running at right angles to the X direction to define an X-Y plane, and the Z direction running perpendicular to both the X direction and Y direction;

(ii) a mating block formed from a second material which differs in at least one radiographic property from the first material, the mating block extending in the X, Y, and Z directions;

(iii) the profile block having a number of profile block thickness areas, each of the number of profile block thickness areas having a different respective dimension in the Z direction;

(iv) the mating block having a number of mating block thickness areas, each of the number of mating block thickness areas having a different respective dimension in the Z direction; and (v) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction, the method including:

(a) with the profile block and the mating block in the test arrangement, transmitting electromagnetic radiation in the Z direction through a segment of the profile block and through an area of the mating block aligned in the Z direction with the segment of the profile block; and (b) acquiring at least one quantity characterizing a radiographic property of the test block in the area of the segment of the profile block, the at least one quantity being acquired in an area of the segment of the profile block which has a predefined minimum spacing in the X direction and the Y direction from each adjacent segment of the profile block.

15. A method of using a test block for detecting the radiographic properties of a combination of a first material and a second material where the test block includes,
  (i) a profile block formed of a first material and extending in an X direction, a Y direction, and a Z direction, the Y direction running at right angles to the X direction to define an X-Y plane, and the Z direction running perpendicular to both the X direction and Y direction;
  (ii) a mating block formed from a second material which differs in at least one radiographic property from the first material, the mating block extending in the X, Y, and Z directions;
  (iii) the profile block having a number of profile block thickness areas, each of the number of profile block thickness areas having a different respective dimension in the Z direction;
  (iv) the mating block having a number of mating block thickness areas, each of the number of mating block thickness areas having a different respective dimension in the Z direction; and
  (v) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction, and where the number of material pairings includes a number of segments, each segment made up of a respective portion of the profile block aligned in the Z direction with a respective portion of the mating block,
  the method including:
  (a) in a training phase (i) irradiating one or all of the segments with a training phase electromagnetic radiation beam directed transverse to the X-Y plane, (ii) for each irradiated segment, detecting electromagnetic radiation from the training phase electromagnetic radiation beam passing through that irradiated segment to produce a grayscale value for that irradiated segment, and (iii) for each irradiated segment, storing the grayscale value produced for that segment and the dimension of the first material in the Z direction for that segment and the dimension of the second material in the Z direction for that segment; and
  (b) in a production phase (i) irradiating a product with a production phase electromagnetic radiation beam corresponding to the training phase electromagnetic radiation beam and directed in a direction transverse to an X-Y plane of the product, (ii) detecting electromagnetic radiation from the production phase electromagnetic radiation beam passing through the product to produce a product grayscale value for the product, and (iii) determining a respective grayscale value stored in the training phase that best corresponds to the product grayscale value, the dimension of the first material in the Z direction and the dimension of the second material in the Z direction indicating a thickness of material layers in the product.

16. A test block for X-ray inspection systems, the test block including:
  (a) a profile block formed of a first material and extending in an X direction, a Y direction, and a Z direction, the Y direction running at right angles to the X direction to define an X-Y plane, and the Z direction running perpendicular to both the X direction and Y direction, the profile block having, in a profile block X-Y matrix extending in the X direction and Y direction, profile block segments each having a constant dimension in the Z direction, each profile block segment being identifiable by its respective coordinates in the X direction and Y direction with a number (n) of profile block segments provided in the X direction and a number (k) of profile block segments provided in the Y direction;
  (b) a mating block formed from a second material which differs in at least one radiographic property from the first material, the mating block extending in the X, Y, and Z directions and including a number (m) of steps in the Y direction, each respective step having a constant Z dimension along the X direction;
  (c) the profile block having a number of profile block thickness areas, each of the number of profile block thickness areas having a different respective dimension in the Z direction;
  (d) the mating block having a number of mating block thickness areas, each of the number of mating block thickness areas having a different respective dimension in the Z direction;
  (e) the profile block and the mating block, when placed in a test arrangement, forming a number of material pairings aligned in the Z direction, each material pairing including one of the number of profile block thickness areas and one of the number of mating block thickness areas, the number of material pairings being arranged in an X-Y matrix extending in the X direction and the Y direction such that a portion of at least two different profile block thickness areas are aligned in the Z direction with at least a portion of a respective one of the mating block thickness areas extending in the X direction, while at least a portion of two different mating block thickness areas are aligned in the Z direction with at least a portion of a respective one of the profile block thickness area extending in the Y direction; and
  (f) wherein when the profile block and mating block are in the test arrangement, multiple profile block segments combine with portions of the mating block to provide a combined overall thickness having a common value across each such multiple profile block segments and such multiple profile block segments in the X-Y matrix are located at coordinates in the X-Y matrix obeying the condition $(x+y)=$ a constant value, where x equals the coordinate in the X direction and y equals the coordinate in the Y direction for the respective profile block segment.

* * * * *